No. 730,784. Patented June 9, 1903.

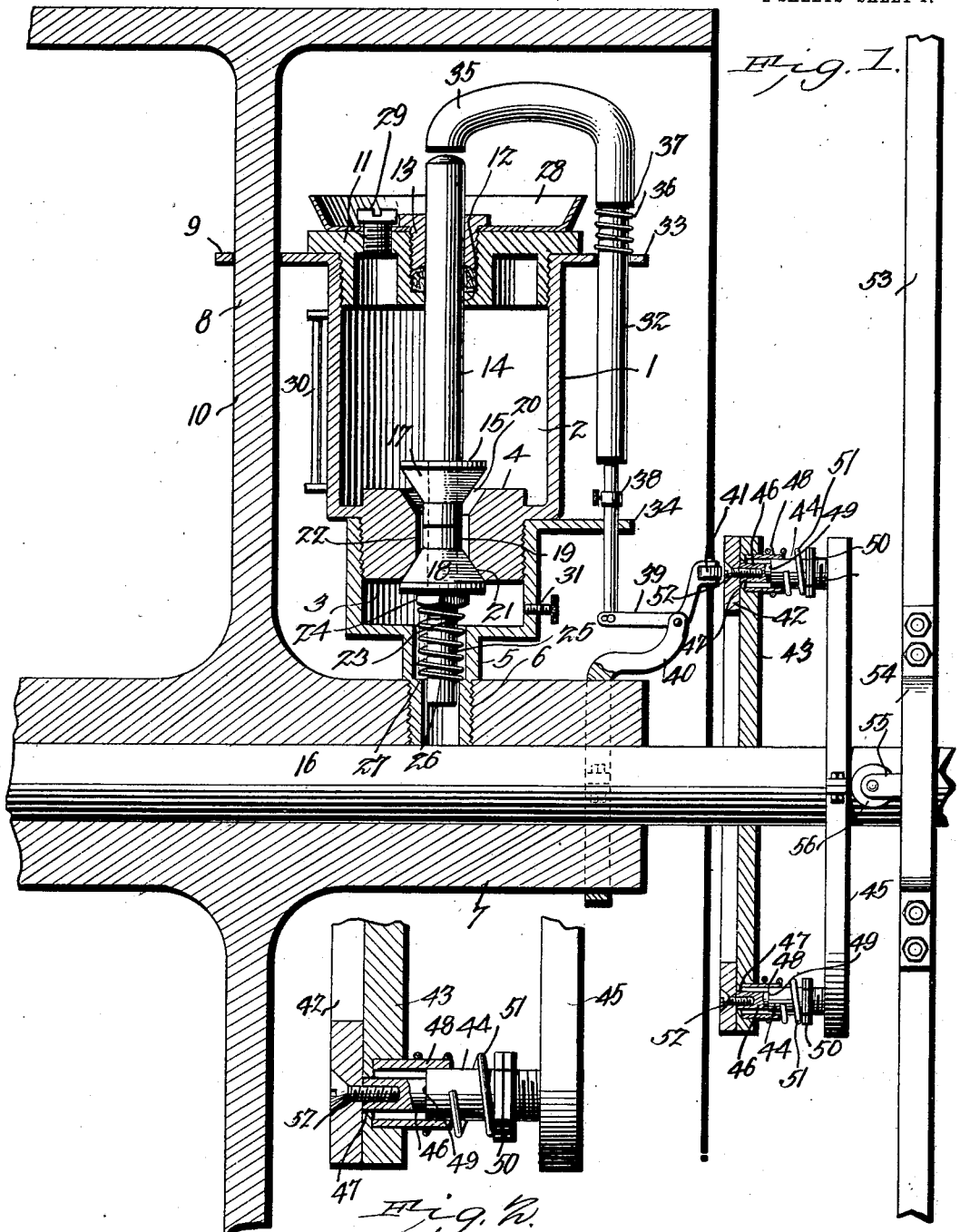

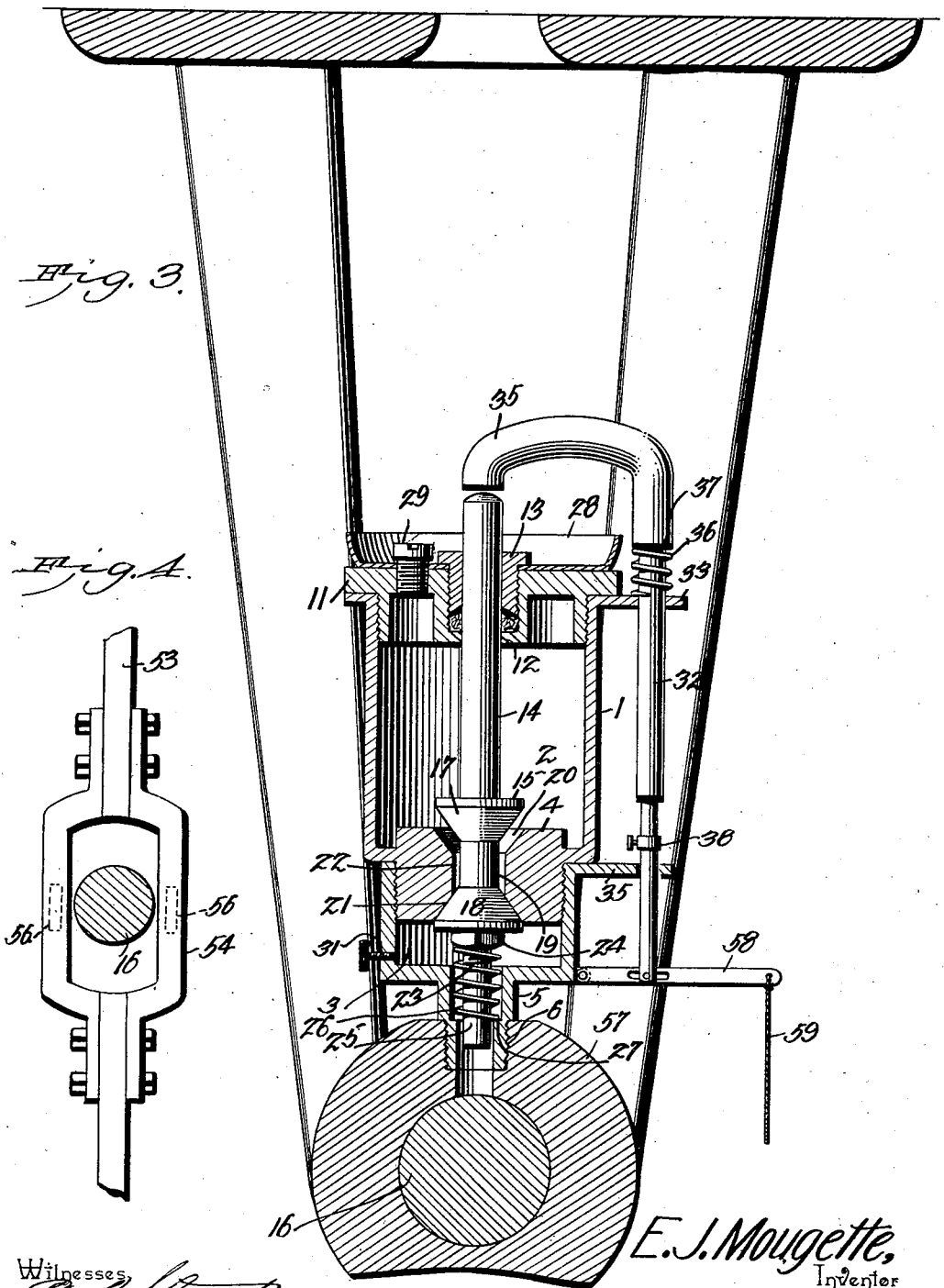

UNITED STATES PATENT OFFICE.

EMIL J. MOUGETTE, OF CHICAGO, ILLINOIS.

LUBRICATOR.

SPECIFICATION forming part of Letters Patent No. 730,784, dated June 9, 1903.

Application filed April 19, 1902. Serial No. 103,777. (No model.)

*To all whom it may concern:*

Be it known that I, EMIL J. MOUGETTE, a citizen of the United States, residing at Chicago, in the county of Cook and State of Illinois, have invented a new and useful Lubricator, of which the following is a specification.

This invention relates generally to lubricators, and particularly to that class adapted for oiling loose pulleys and line and counter shafts.

The object of the invention is in a ready, simple, thoroughly efficient, and practical manner to effect oiling of a loose pulley or a shaft from the floor and while such parts are running.

With these and other objects in view, as will appear as the nature of the invention is better understood, the same consists in the novel construction and combination of parts of a lubricator, as will be hereinafter fully described and claimed.

In the accompanying drawings, forming a part of this specification, and in which like numerals of reference indicate corresponding parts, there are illustrated two forms of embodiment of the invention each capable of carrying the invention into practical operation, it being understood that the elements therein exhibited may be varied or changed as to shape, proportion, and exact manner of assemblage without departing from the spirit thereof.

In the drawings, Figure 1 is a view in sectional elevation, exhibiting the lubricator as applied to a loose pulley. Fig. 2 is a sectional detail view, on an enlarged scale, of a portion of the mechanism for effecting release of the oil-escape valve. Fig. 3 is a view in sectional elevation, exhibiting a lubricator as applied to the journal-box of a line-shaft. Fig. 4 is a view in elevation of a portion of a lever employed for operating the oil-escape valve.

Referring to the drawings and to Figs. 1, 2, and 4 thereof, 1 designates an oil-cup comprising a receiving-chamber 2 and a distributing-chamber 3. The receiving-chamber is provided at its lower portion with a valve-seat 4, the upper and lower faces of which project, respectively, above and below the bottom of the said chamber, and the lower projecting portion is exteriorly threaded to be engaged by interior threads on the distributing-chamber 3, as clearly shown in Fig. 1. The latter chamber is provided with a downward-projecting hollow extension or neck 5, the same being threaded for a portion of its length at 6 to engage with a threaded opening in the hub 7 of a loose pulley 8, by which means the device is held in position for use, the oil-receiving chamber being provided with a bracket 9 to be clamped about one of the spokes 10 of the pulley, thereby to effect a rigid securing of the lubricator in position and to relieve strain from the threaded neck 5. The mouth of the oil-receiving chamber is closed by a threaded plug 11, having a centrally-arranged bearing 12, carrying a stuffing-box 13, and in the bearing and the stuffing-box works the stem 14 of a valve 15, that constitutes a combined escape and cut-off valve, as when moved in one direction it permits oil to escape to the distributing-chamber, thence to the shaft 16, carrying the pulley, and when moved in the opposite direction cuts off the escape of oil to the distributing-chamber. The valve, as clearly shown in Fig. 1, is a spool-shaped structure composed of two oppositely-disposed tapered valves 17 and 18, separated by a shank 19, these parts to be integral or separable, as preferred. This valve is disposed in an opening in the valve-seat 4, the extremities of the opening being turned out to fit the valve, as at 20 and 21, thus in reality presenting two valve-seats, and the intermediate portion 22 of the opening between the two seats being of greater diameter than the shank 19 in order to present a passage-way for escape of oil to the distributing-chamber. The lower portion of the valve-stem is reduced in diameter for the reception of the valve and has that portion adjacent to and exterior of the lower valve threaded at 23 for the reception of a nut 24 for clamping the valve in position. From the threaded portion 23 to the lower terminal of the stem the latter is again reduced in diameter to present an extension 25, that works in the neck 5, a coiled spring 26, placed on the reduced portion 25 and bearing at one end against the nut 24 and at its opposite end against a shoulder 27, formed in the neck, operating to keep the valve 18 normally seated, and thus cut off the escape of oil to the distributing-chamber. As a means of supplying oil to the receiving-chamber the latter has associated with it a pan-shaped vessel 28, into which the oil is poured from a suitable holder, whence it escapes through an opening in the pan and in the top of the plug to the receiving-chamber, the said opening being normally closed by a threaded closure 29. The oil-receiver has connected with it a glass gage 30, by which to determine the quantity of oil in the receiving-chamber when the same is in a vertical position, it being understood that this device is intended to travel with the pulley. The distributing-chamber is provided near its bottom with an opening normally sealed by a threaded closure 31, the object of the opening being to permit the nozzle of a small hand-pump being inserted within the distributing-chamber to suck out any gummy oil that may accumulate therein. The means for depressing the stem comprises a trip-rod 32, working in guides 33 and 34, extending laterally from the oil-receiving chamber and oil-distributing chamber, respectively, the upper end of the trip-rod being curved or bent to bring its terminal over the stem 14, whereby when the said rod is depressed it will engage with the stem, and thus trip the valve 18. To keep the arm 35 of the trip-rod normally out of engagement with the stem, a coiled spring 36 is employed, one end of which bears against the upper side of the guide 33 and its other end against a shoulder 37, formed by reducing the diameter of the trip-rod, as shown. That portion of the trip-rod that works in the guide 34 is of less diameter than that working in the guide 33 and carries an adjustable stop 38, by which to limit the downward movement of the trip-rod, and thus regulate the quantity of oil fed to the journal. The means for actuating the trip-rod to cause it to unseat the valve 18 comprises a trip-lever 39, fulcrumed upon a bracket 40, secured upon the hub 7 of the pulley and projecting laterally beyond the same, the inner end of the said lever being pivotally connected with the lower terminal of the trip-rod, as clearly shown in Fig. 1. The outer end of the trip-lever carries a horizontally-disposed roller 41, adapted to be engaged by an annulus 42, carried by a disk 43, rigid on the shaft, the annulus, which constitutes a trip-plate, being connected with four studs 44, (only two being shown in this instance,) carried by a disk 45, loose on the shaft. Each of the studs is provided with a threaded terminal to engage the disk 45 and with a reduced terminal 46 to project through an opening 47 in the disk 43, thereby to effect outward projection of the annulus to bring it into engagement with the roller of the trip-lever. The disk 43 is provided with four tubular guides 48, (only two being shown in this instance,) in which the larger portion of each of the studs works, the shoulder 49, formed by the outer reduced portion, constituting a stop to limit the outward movement of the studs, and thus of the trip-plate. The stud carries two jam-nuts 50, against one of which bears one end of a coiled spring 51, the other end of which bears against the outer face of the disk 43, these springs operating normally to hold the trip-plate in engagement with the disk 43, and thus out of engagement with the roller of the trip-lever. The trip-plate is associated with the studs 44 by screws 52, the heads of which are let in flush with the outer face of the plate, thus to obviate the presentation of obstructions which would tend to interfere with the proper operation of the trip-lever. By adjusting the jam-nuts 50 on the studs the springs 51 may be placed under the requisite tension always to cause the trip-plate to bear closely against the disk 43. The means for shifting the disk 45 on the shaft thus to effect projection of the trip-plate comprises a trip-lever 53, the upper end of which is supported overhead in the usual or any preferred manner, and its lower end is disposed within convenient reaching distance from the floor. The intermediate portion of the lever is provided with a yoke 54, (clearly shown in Fig. 4,) which spans the shaft and carries two forward-projecting arms 55, with which are associated rollers 56 (one only being shown) to engage with the outer face of the disk 45. Thus when the shift-lever is moved toward the disk 45 the rollers by engagement with the disk will move it laterally on the shaft, and thus project the trip-plate, which latter will then engage the trip-lever and depress its inner end, thereby drawing down the trip-rod and unseating the valve 18 to permit oil to escape to the distributing-chamber and thence to the shaft. If a sufficient quantity of oil is not supplied at one operation of the valve, it may be readily operated as often as necessary to supply the desired quantity.

In the form of embodiment of the invention shown in Fig. 3 the only change from that shown in Figs. 1 and 4 is in the means for operating the trip-rod, the lubricator in this instance being associated with the journal-box 57 of the shaft, and therefore stationary. The means for depressing the trip-rod comprises a trip-lever 58, one end of which is fulcrumed to the distributing-chamber 3, and its other end has associated with it a cord or chain 59, which extends downward within convenient reaching distance of the floor, the trip-rod being associated with the trip-lever intermediate of the ends of the latter. It will be seen that upon drawing downward upon the cord or chain 59 the trip-rod will be also drawn down, thereby to depress the stem and permit escape of oil from the receiving-chamber to the distributing-chamber and thence to the journal-box.

While the device of this invention is herein exhibited as applied only to a loose pulley and to the journal-box of a line-shaft, it is to be understood that its use is not to be limited merely to these two adaptations, as it will be obvious it may be employed in connection with any piece of machinery where certain of its parts are difficult of access for the purpose of oiling and still be within the scope of the invention.

Having thus fully described my invention, what I claim as new, and desire to secure by Letters Patent, is—

1. In a lubricator, the combination with the valve-stem thereof, of a spring-pressed trip-rod normally out of engagement with the stem, a trip-lever connected with the lower end of the trip-rod, and means for rocking the trip-lever to bring the trip-rod into engagement with the valve-stem.

2. In a pulley-lubricator, an oil-chamber, an oil-controlling valve therein having its stem projecting beyond the chamber, valve-stem-operating means arranged adjacent to the stem, laterally-shiftable means carried by the pulley-shaft, and a movable element connected with the valve-stem-operating means, and disposed in the path of movement of the shiftable means.

3. In a lubricator, the combination with the valve-stem thereof, of a spring-pressed trip-rod normally out of engagement with the stem, a trip-lever associated with the trip-rod, a trip-plate supported adjacent to the free end of the trip-lever, and means for projecting the plate to cause it to engage the trip-lever and thus depress the trip-rod.

4. In a lubricator, the combination with the valve-stem thereof, of a spring-pressed trip-rod normally out of engagement with the stem, a trip-lever associated with the trip-rod, a rotary disk, a trip-plate carried by the disk, a movable disk operatively connected with the trip-plate, and means for imparting lateral motion to the movable disk to bring the trip-plate into engagement with the trip-lever.

In testimony that I claim the foregoing as my own I have hereto affixed my signature in the presence of two witnesses.

EMIL J. MOUGETTE.

Witnesses:
GEORGE H. SCHAEFER,
ANDREW S. DIEKMAN.